US012094369B1

(12) United States Patent
Rupell

(10) Patent No.: US 12,094,369 B1
(45) Date of Patent: Sep. 17, 2024

(54) IMAGE DISPLAY APPARATUS AND METHOD FOR ITS MANUFACTURE AND USE

(71) Applicant: Cory Rupell, Greenville, NY (US)

(72) Inventor: Cory Rupell, Greenville, NY (US)

(73) Assignee: Cory Rupell, Greenville, NY (US)

( * ) Notice: Subject to any disclaimer, the term of this patent is extended or adjusted under 35 U.S.C. 154(b) by 0 days.

(21) Appl. No.: 17/460,214

(22) Filed: Aug. 28, 2021

Related U.S. Application Data

(60) Provisional application No. 63/071,204, filed on Aug. 27, 2020.

(51) Int. Cl.
*A47G 1/12* (2006.01)
*G09F 9/30* (2006.01)

(52) U.S. Cl.
CPC .................................... *G09F 9/301* (2013.01)

(58) Field of Classification Search
CPC . G09F 9/301; G09F 9/335; G09F 9/30; G09F 9/3026; G09F 9/33; G09F 9/35; G09F 15/0031; G09F 15/0037; G09F 15/005; G09F 15/0075; G09F 27/00; G09F 15/0018
See application file for complete search history.

(56) References Cited

U.S. PATENT DOCUMENTS 5,422,737 A * 6/1995 Atoji .................... H04N 1/0852
355/75

* cited by examiner

*Primary Examiner* — Elmito Breval
(74) *Attorney, Agent, or Firm* — Gerard H. Bencen, Esq.; Patent-Arts

(57) ABSTRACT

Components of the present image display apparatus, their mode of manufacture and assembly to display the image, include:
(a) a ring component 1 comprising a vertical element 12 and a decorative face 13 element dimensioned so as, when assembled, to accommodate and retain in fixed but removable association with said ring component 1 both (i) a core component 17 and (ii) an image for display deployed on a support substrate, said core component 17 assembled on a first, outer aspect of the ring component 1 in relation to said vertical element 12, and said image for display deployed on a support substrate on a second, interior aspect of the ring component 1 in relation to said vertical element 12, to thereby present the image, including artwork, signage or the like, to the exterior of the apparatus for viewing;
(b) a core component 17, which in some embodiments bears decoration on an exterior aspect thereof, said core component being dimensioned and shaped to receive and be retained by the ring component 1; and, optionally,
(c) at least one backer-board retained in register with said image.

17 Claims, 12 Drawing Sheets

20A

20B

IMAGE DISPLAY APPARATUS AND METHOD FOR ITS MANUFACTURE AND USE

FIELD OF THE INVENTION

Display devices for artwork, signage and other images and methods for making and use thereof.

BACKGROUND OF THE INVENTION

Almost all displays of signage, art or other images, such as picture frames and the like, comprise square or rectangular shapes, due to manufacturing difficulty and cost of manufacture of displays with different geometries. Display devices comprising round, oval, or square display device comprising rounded corners require a bulk manufacturing process or specialized tools, making single piece customization very expensive. The present invention provides a display apparatus, and a method for its manufacture and use which overcomes these limitations.

SUMMARY OF THE INVENTION

The present invention provides an apparatus for display of images of various shapes and sizes, including but not limited to square, rectangular, circular, oval, or other shapes, including square, rectangular or other angular shapes having rounded corners or vertices. Conventional structures with respect to which the present invention provides a novel and inventive departure are commonly referred to as picture frames. The method for manufacture and use of the components of the present image display device enables facile assembly and inexpensive manufacture of its component parts, thus accommodating a much broader range of image shapes, sizes, and substrates, including but not limited to paper, board, wood, canvas, metal, glass or fabric, for display. The apparatus according to this invention is assembled, without the need for tools, from inter-locking components of almost any shape, which are retained in assembled form due to inclusion of barbs, projections or circumferential extensions of a portion of the ring component sized to tightly fit the components together, while retaining the image substrate therein. Components of the present image display apparatus, their mode of manufacture and assembly to display said image, include:

(a) a ring component 1 comprising a vertical element 12 and a decorative face 13 element dimensioned so as, when assembled, to accommodate and retain in fixed but removable association with said ring component 1 both (i) a core component 17 and (ii) an image for display deployed on a support substrate, said core component 17 assembled on a first, outer aspect of the ring component 1 in relation to said vertical element 12, and said image for display deployed on a support substrate on a second, interior aspect of the ring component 1 in relation to said vertical element 12, to thereby present the image, including artwork, signage or the like, to the exterior of the apparatus for viewing; in an alternative embodiment, these elements are modified by inclusion of Removable Ring 1Y and the Sub-Ring IZ, as further described herein below;

(b) a core component 17, which in some embodiments bears decoration on an exterior aspect thereof, said core component being dimensioned and shaped to receive and be retained by the ring component 1; and, optionally, in certain preferred embodiments, as the Core component 17 is not permanently affixed to the Ring 1, in situations where redecorating the Core component 17, resizing the height of the Core component 17 is desired, or simply converting the single apparatus (Ring 1, Removable Ring 1Y, or Sub-ring 1Z) into two frame-like products by removing the Core component 17 is desired.

(c) at least one backer-board 30 retained in register with said image for display deployed on a support substrate if the image is not printed on a rigid substrate.

Figure 1:
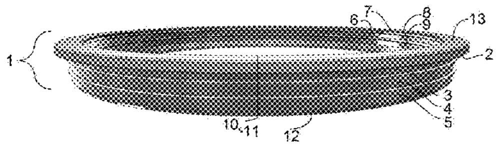
FIG. 1 provides an upper side perspective view of a first, substantially circular or elliptical embodiment of ring component 1.
Figure 2:
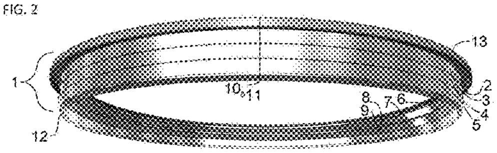
FIG. 2 provides a lower side perspective view of a first embodiment of ring component 1.

Should the embodiment of the image be created using other methods, such as embroidery, sewing or by any other means created on the surface of a first substrate 23, 8A, and which, in this figure, is then adhered, 8C, to e.g. a sticky, loop and hook (aka VELCRO®) or like adherent surface 26B present on or revealed on a support substrate 26B when a protective sheet 26A is removed from an incipiently adherent substrate 26B, if needed, 8C, such that when the bottom side (i.e. the obverse) of the image substrate 22 is contacted with the adherent surface 26B, 8D, it adheres thereto such that the support substrate 26B supports the image 22, such that when assembled, an image component 26 in 8D is created and ready to be exhibited when assembled with said ring component 1.

Figure 9:
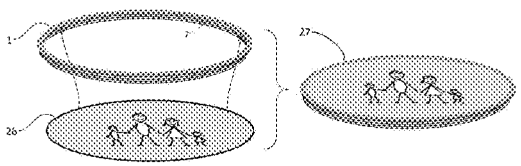

FIG. 9 provides a representation of the assembly of the assembled image display component 26 of a first embodiment of the present invention with a first embodiment of the ring component 1 of the invention to produce an assembled combined image and ring component 27 ready for assembly with the remaining components of the invention.

Figure 10:
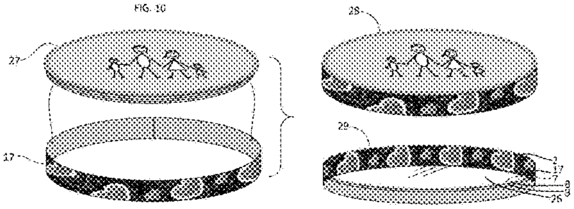

FIG. 10 a top perspective of the image and ring component 27 as it is inserted into the decorated core element 17 to form the image-ring-core component 28 according to the invention, and the bottom perspective of the image-ring-core component shown as 29. This component is then ready for assembly with the remaining components of the invention.

Figure 11:
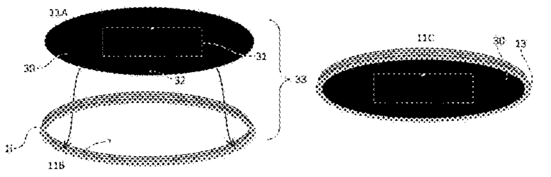

FIG. 11 provides a representation 11A of a first embodiment of a backer-board component 30 of the invention, manufactured or cut to match the shape and size of the rear ring component 1*i* as it is inserted into the rear ring component 1*i* 11B to form a complete back-side 33 of the image display apparatus according to this invention 11C.

Figure 12:
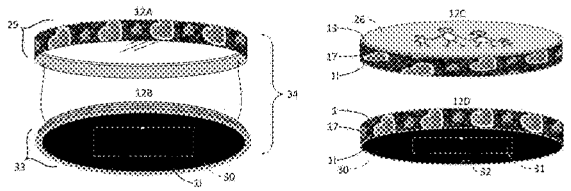

FIG. 12, 12A provides a bottom representation of the completely assembled core-image-ring components 29 as in FIG. 10, along with the back-side component 33 shown as 12B, that both are assembled to form a completed product 34 according to this invention, with the top perspective shown as 12C and the lower perspective shown as 12D.

Figure 13:
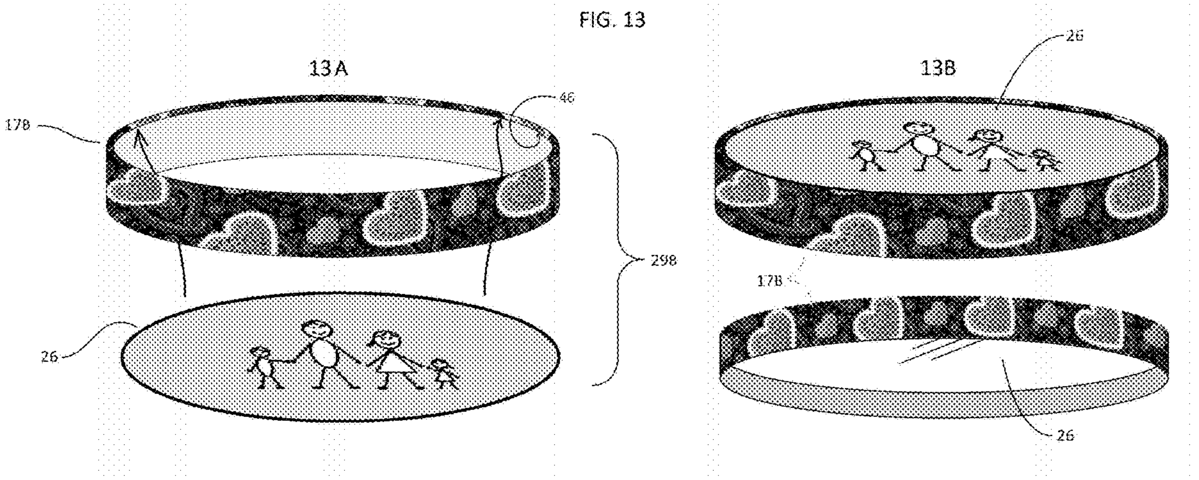

FIG. 13 provides a top perspective of a decorated core element that has been shaped on one end 17B using a paper tube curling process to provide a forward stop 46 so it is able to receive and hold in place the assembled display image component 26. Once the display image component 26 is inserted into the receiving end of the shaped decorated core element 17B, it forms a completed body and display portion of the preferred embodiment of this invention, shown as item 29B, in both the top and bottom perspectives.

Figure 14:
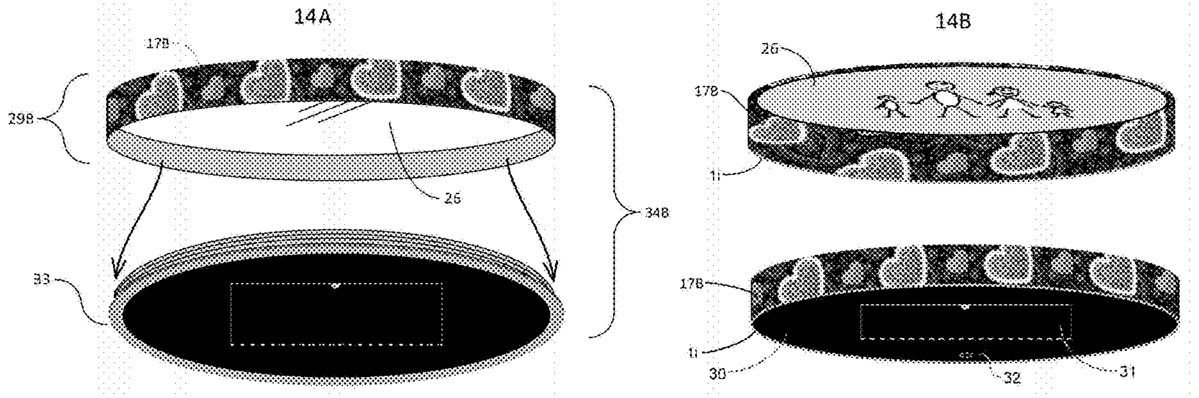

FIG. 14 Once assembled, the image-backboard-core component 29B is inserted over the barbs of the completely assembled back-side component 33 so that when both are assembled, as seen in 14A, they form a completed product according to this invention 34B; as can be seen in 14B in both the top and bottom assembled perspectives.

Figure 15:
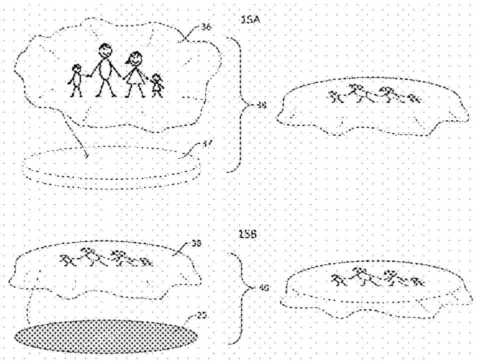
Figure 16:
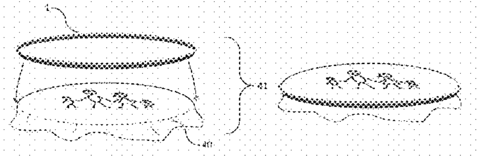

FIG. 15 provides a representation of an embodiment according to this invention wherein an image, such as artwork, is printed, painted, or stitched on a flexible substrate such as fabric 36 in 15A that is placed over or stretched across a pad 37, such as a foam pad, thereby imposing a convex shape 38 to the image when inserted into the ring 1 in FIG. 16. In 15B, the image and pad 38 is stacked on and supported by a backer-board component 25 thereby forming an image-pad-backer-board component 40, ready to be assembled with the remaining components of the apparatus.

Figure 6:
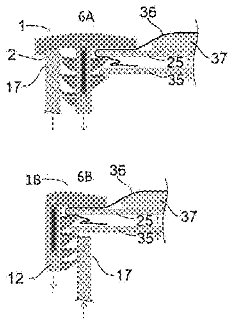
FIG. 6 a cross-sectional side view is provided in 6A, showing the ring component 1 after receiving the core element 17 and a flexible substrate, e.g. textile or like flexible substrate 36 bearing an image for display disposed therein, supported by a pad element 37, and a support element 25, which supports the flexible substrate 36 bearing the image for display, thereby providing a "cushion top" or convex feature, all disposed within ring component 1.

FIG. 16 provides a top perspective representation of the assembly of the image-pad-backer-board component 40 such that these components are locked into place inside a ring component 1 to complete a top assembly 41 that is depicted in detail in FIG. 6, ready to be assembled with the remaining components of the apparatus.

Figure 17:
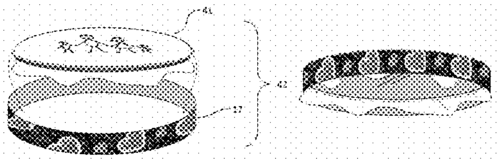

FIG. 17 provides a representation of a top assembly 41 being inserted into an outer-decorative core 17, so as to produce an image-core assembly 42 depicted here with an under-side view.

Figure 18:
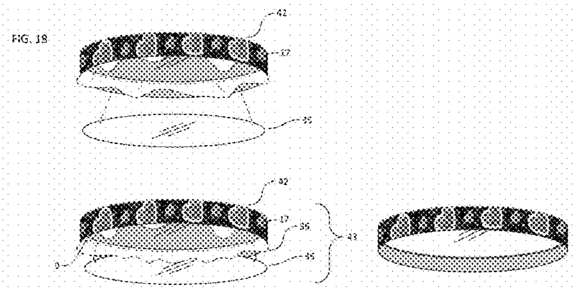

FIG. 18 provides an under-side representation of an image-ring-foam-backer-board-core assembly showing how excess flexible substrate, 36 hanging loose within the core element may be hidden by inserting an optional secondary backer-board component 35 into the inside of the core component, for retention by a barb 9 defined in the interior of the ring component 1, which also retains the shape of the outer-decorative core 17 in association with each other to produce the finished top component 43, ready to receive a final backer-board to complete the apparatus, although the invention may be deemed completed without any further aspect.

Figure 19:
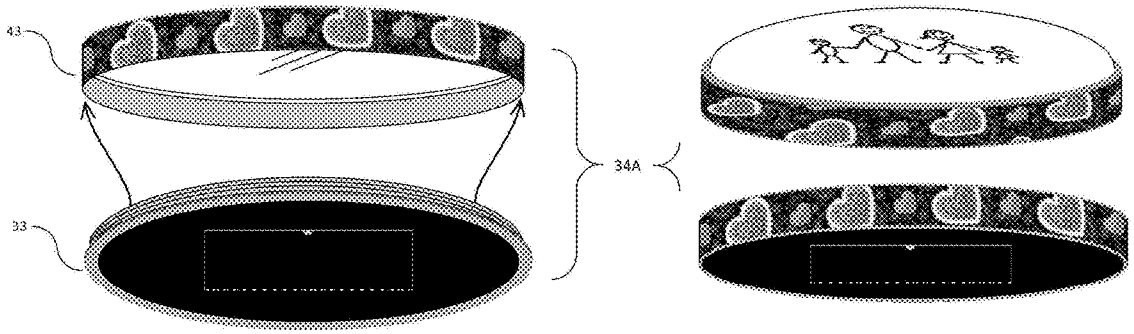

FIG. 19 shows an under-side perspective of the assembly of the print-ring-foam-backer board-core component 43 receiving and being assembled with a separately assembled rear ring-backer-board component 33 to produce an embodiment of the fully assembled apparatus with the top and bottom perspective shown as 34A.

Figure 20:
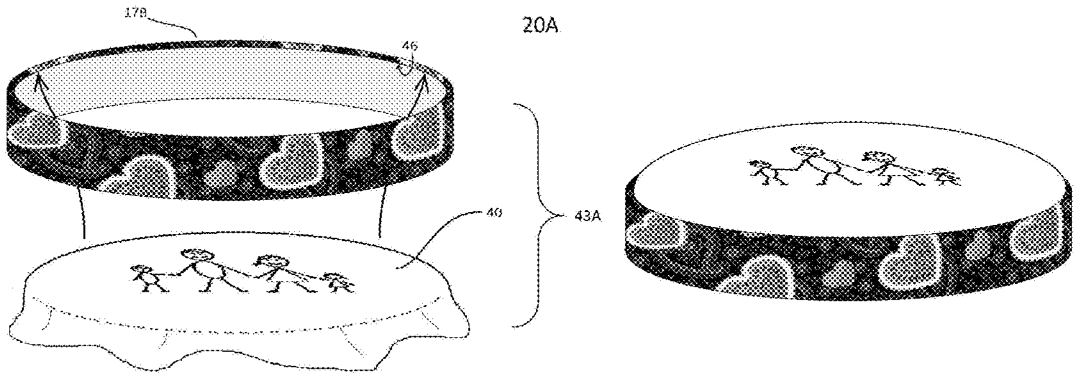
Figure 20:
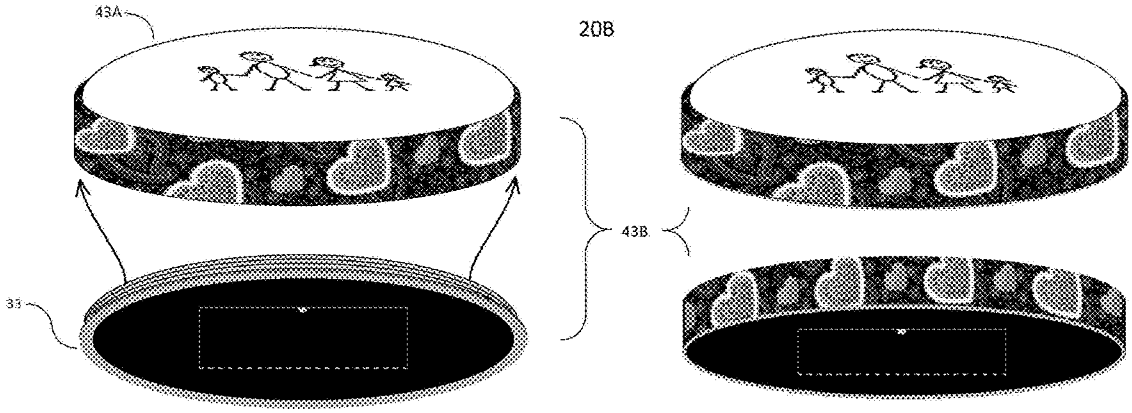

FIG. 20 An upper-side perspective view of an embodiment of a decorated core element that has been shaped on one end 17B using a tube curling process is presented in 20A, is assembled with the image-foam-backer-board component 40 to form the top part of the product that will be visible when displayed according to this invention. 20B provides a top-side representation of an assembled print-foam-baker-board-curled core 43A as it is receiving the separately assembled ring-backer-board 33 component as shown in 20B to produce an embodiment of the fully assembled apparatus in accordance with this invention shown in both the top and bottom side perspectives 43B.

Figure 21:
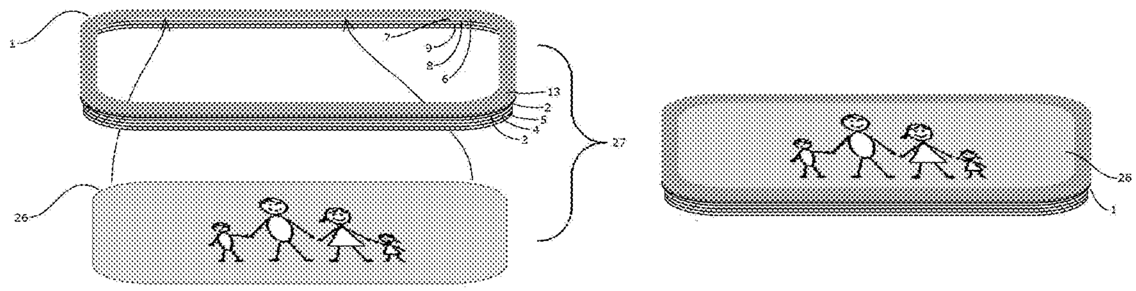

FIG. 21 provides a representation of a substantially rectangular ring component 1 which is assembled over the substantially rectangular image 26 to form the top component 27, to prepare for assembly with other components according to the invention, dimensioned appropriately, substantially as described in FIGS. 1-20.

Figure 22:
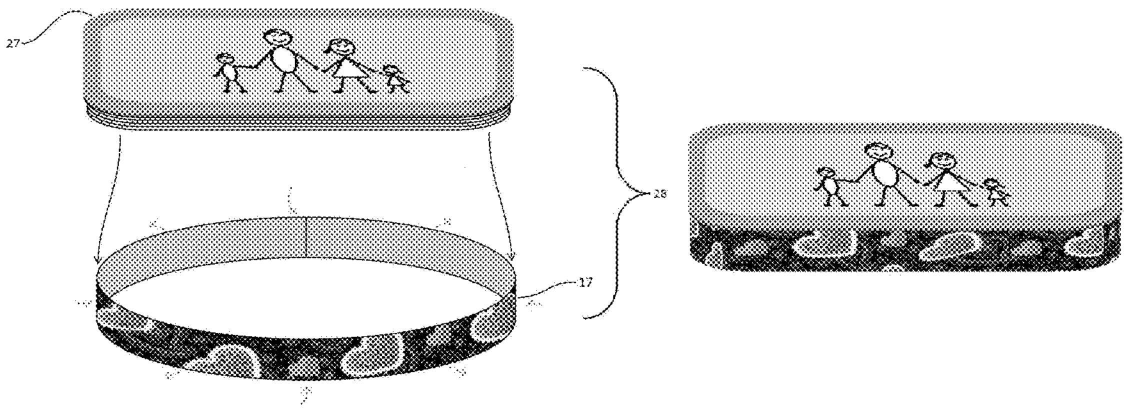

FIG. 22 provides a top perspective representation of the substantially rectangular image-ring component 27 which is then contacted with and deployed within a flexible core component 17 that is manipulated to match the outer contours and shape of the substantially rectangular image-ring component 27 to form the completed top image-ring-core component 28.

Figure 23:
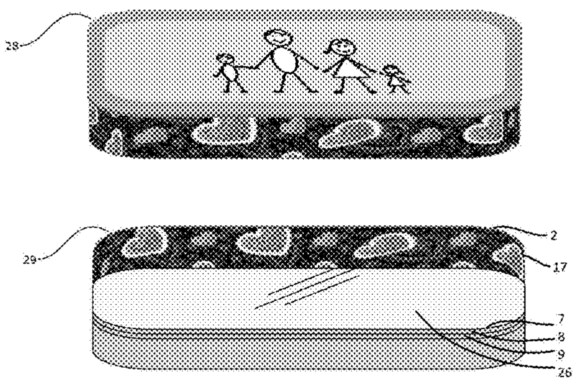

FIG. 23 provides a representation of the top perspective view of an assembled image-ring-core component 28 of a substantially rectangular embodiment of the apparatus according to the invention, which is also depicted from a bottom perspective view when the assembled structure flipped over 29.

Figure 24:
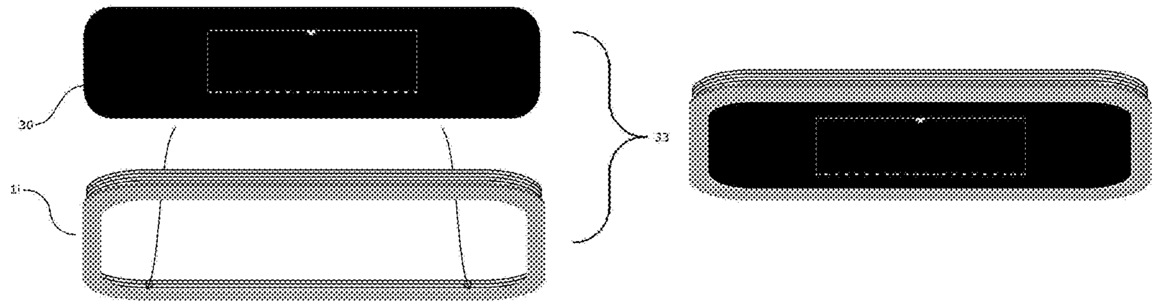

FIG. 24 provides a representation of an appropriately shaped and dimensioned backer-board component 30 which is inserted into the back of the substantially rectangular rear ring component 1*i* that may or may not be differentiated from the ring component 1, which is also shown assembled as 33.

Figure 25:
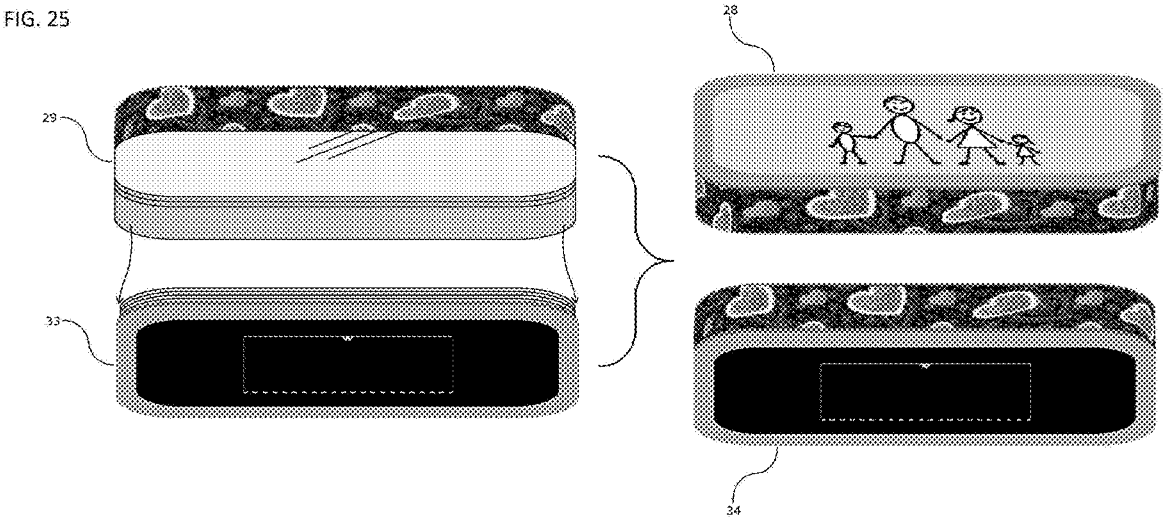

FIG. 25 provides an underside representation of assemblage of the artwork-ring-core component 29 with the assembled substantially rectangular backer-board and ring component 33 which is inserted into an appropriately dimensioned and shaped artwork-ring-core component 29 to produce an embodiment of the fully assembled apparatus seen as a top perspective in 28 and from a bottom perspective in 34. The previously depicted use of different flexible substrates FIG. 15 can also be used in this substantially rectangular form or any other shaped form of the ring.

Figure 26:
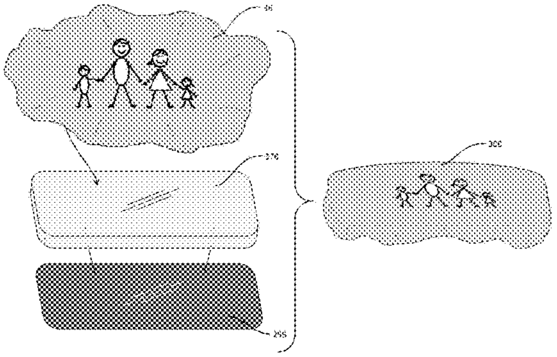

FIG. 26 provides a representation of an embodiment according to this invention wherein an image, such as artwork, is printed or painted on a flexible substrate such as fabric 36 which is stretched across a pad 37B, such as a foam pad, thereby imposing a convex shape 38B to the image. The image 36 and pad 37B are stacked on and supported by a backer-board component 25B thereby forming an image-pad-backer-board component 38B, ready to be assembled with the remaining components of the apparatus.

Figure 27:
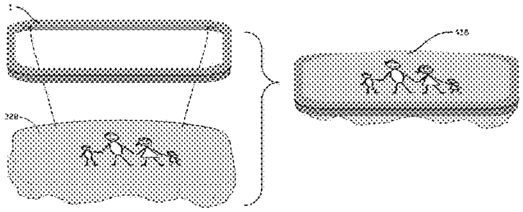

FIG. 27 provides a top perspective representation of the assembly of the image-pad-backer-board component 38B such that these components are inserted into and locked into place inside a ring component 1 to complete a top assembly 41B, ready to be assembled with the remaining components of the apparatus.

Figure 28:
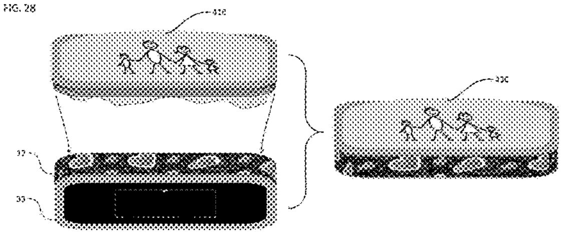

FIG. 28 provides a top perspective representation of the assembly of the image-pad-backer-board-ring components 41B, being inserted into the core component 17 which has been positioned over the rear ring-backerboard component 33 and locked into place. All of these components are assembled together to form a completed product in accordance with this invention indicated as 43C.

Figure 29:
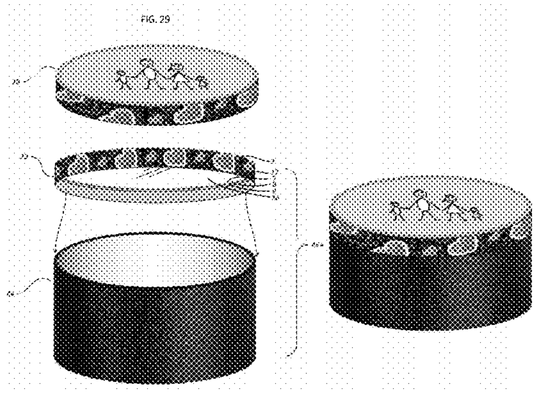

FIG. 29 provides a top perspective view representation of a further embodiment of the apparatus according to this invention comprising an assemblage of an image, such as artwork, and appropriately dimensioned and shaped ring and core components 28, and a perspective view of the underside view of the same components 29, wherein that assemblage is deployed as a decorative top or lid element for a similarly shaped and dimensioned keepsake box 44, which is also shown fully assembled 45A.

Figure 30:
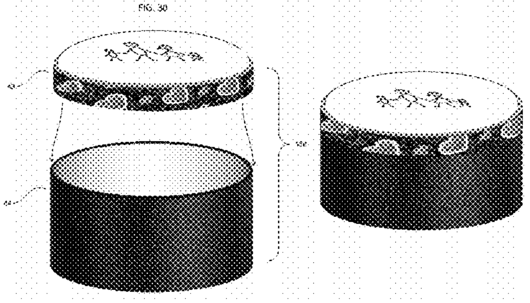

FIG. 30 provides a completed top view representation of the apparatus containing the print-pad-ring-backer-board-core 43, that may include a secondary board to obscure excess fabric from view, as it is being placed over the lower pre-manufactured container 44 suitable for decorative display in a manner seen fit. Together, they form a closed and completed aspect of this invention 45B.

Figure 31:
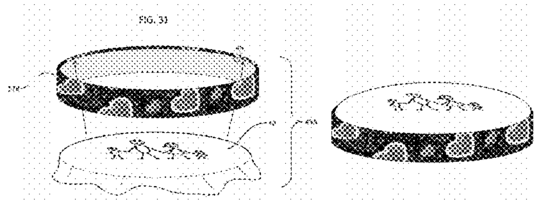

FIG. 31 provides an upper-side perspective view of an embodiment of a decorated core element that has been shaped on one end 17B using a tube curling process, and this is assembled with the image-pad-backer-board component 40 to form a completed aspect of this invention 43A.

Figure 32:
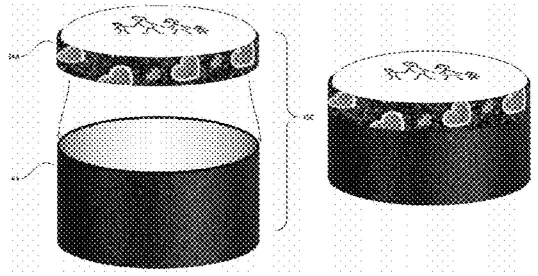

FIG. 32 provides a top perspective of the assembled top image-pad-backer-board-curled core 34A as it is positioned over and joining with the keepsake container 44 to create a cushion-top effect for the completely assembled keepsake container 45C.

Figure 3:
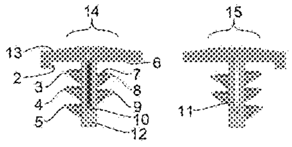
FIG. 3 provides a cross-sectional side view of opposing edges of ring component 1, showing elements (14), cross-sectioned through the left side of ring component 1, and elements (15), cross-sectioned through the right side of ring component 1, which is manufactured either as a continuous and unitary ring component 1, or which is manufactured as a linear component, which is then trimmed or cut to a desired length with two terminal ends, one male 10, and one female 11 that is a void throughout the length of the component except for the aforementioned male end 10, said length then conformed to a desired shape, and the two terminal ends are connected to each other to form the desired continuous ring component 1.
Figure 33:
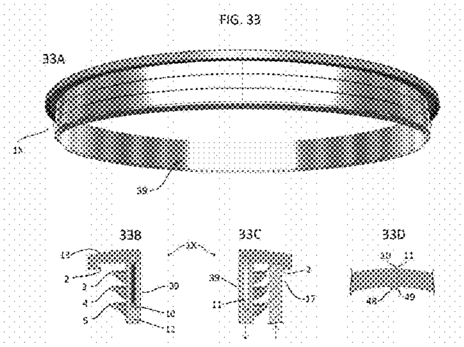

FIG. 33 provides a bottom perspective of a ring component 1X in 33A with an inside finished area 39 that differs from the standard ring component 1 in that it does not have any inside barbs that are otherwise used to hold in place a print-pad-backer board as shown in FIG. 3 and FIG. 6. The purpose of this ring component 1X configuration is for it to be used in conjunction with a core 17 or 17B where edging would otherwise remain unfinished, exposing potential irregularities on the decorated core edge, seen in FIG. 34 as component 43A. The ring component 1X also serves to protect the edge of the core 17 or 17B from wear during likely frequent handling. 33B, 33C, and 33D all show the representation of the ring 1X as image 1 did in FIG. 3, FIG. 4, and FIG. 5.

Figure 34:
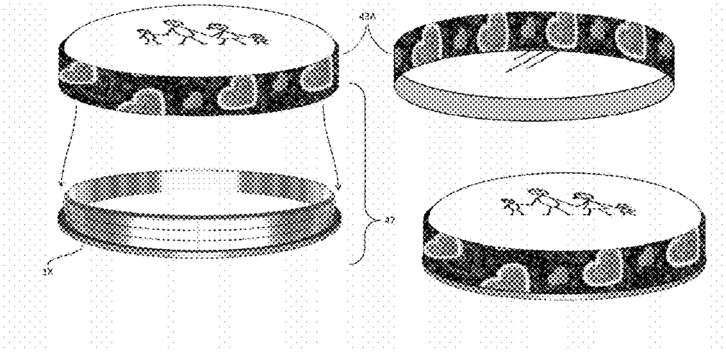

FIG. 34 provides both an upper and lower perspective representation of the flexible print-pad-backer-board-core embodiments 43A as it is positioned and pressed over the decorative and protective ring 1X to complete a top display assembly 47.

Figure 35:
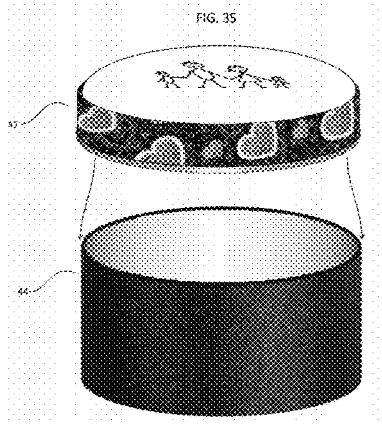

FIG. 35 provides a top perspective representation of a complete flexible print-pad-backer-board-core-ring embodiment top display assembly 47 as it is being positioned over a keepsake container 44.

Figure 36:
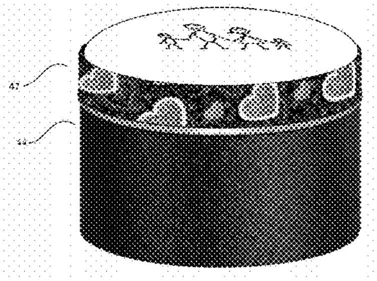

FIG. 36 provides a top perspective representation of a complete keepsake container, with both embodiments 44 and 47 completely assembled.

Figure 37:
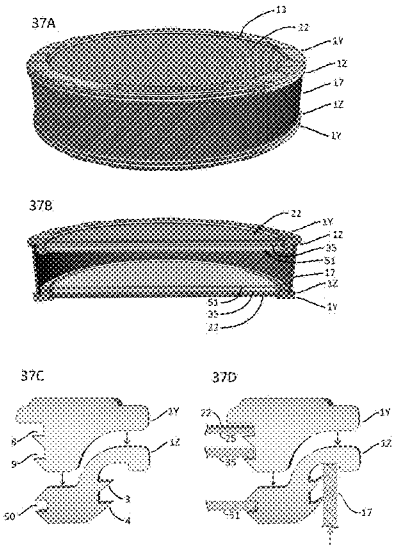

FIG. 37 provides one completely assembled top perspective representation of a fully assembled apparatus in 37A of a method of assembling a Removable Ring 1Y that can be separated from a Sub-Ring 1Z, making the apparatus more suitable to be used as a storage or keepsake-like container, while protecting the edge of the Core component 17; even if used as wall art, desktop art, a puzzle box, a tree ornament, or any other decorative container. Molded geometry is one example of a decorative face 13 as part of the Removable Ring 1Y. Image 37B shows the same perspective as image 37A of a fully assembled apparatus that has been pared to reveal all assembled components. There, you will see the accompanying product elements such as the rigid substrate 22, and a secondary backer-board 35, both designed to complete the Removable Ring 1Y. In its connected state to the Sub-Ring 1Z, another optional backer board 51 is used to close off the fully assembled product if it is used as signage or a slender keepsake product, without the use of a Core component 17 or a secondary Removable Ring 1Y and secondary Sub-Ring 1Z. FIG. 37 also demonstrates a cross-sectioned perspective of both the Removable Ring 1Y and secondary Sub-Ring 1Z in image 37C, without the other apparatus elements. The same barbs that were used in the original Ring 1 design in FIG. 3 are again employed, in addition to the space made available as element 50 to hold the optional backer board 51 in place. Image 37D provides the same cross-sectional perspective along with the added previously defined elements of substrate 22, support 25, a secondary backer-board 35, a Core component 17, and the optional backer-board 51.

Figure 38:
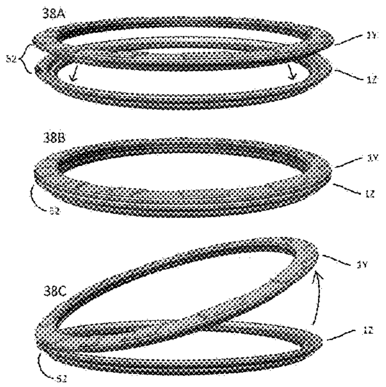

FIG. 38 separates the previously described apparatus elements from the Removable Ring 1Y and Sub Ring 1Z to focus on connection possibilities. Image 38A shows both of the aforementioned elements prior to them being connected by way of a hinge 52 element. In 38B the Removable Ring 1Y and Sub Ring 1Z have been connected via the hinge 52 and are resting in the closed position. Image 38C depicts the Removable Ring 1Y and Sub Ring 1Z in a partially separated position while remaining connected at the hinge 52.

Figure 39:
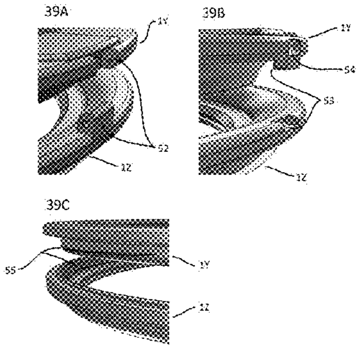

FIG. 39 provides a close-up perspective of three different methods of connecting the Removable Ring 1Y to the Sub Ring 1Z. Image 39A is a close-up perspective of the aforementioned hinge 52, that primarily uses a ball and socket connection. The hemisphere shown as part of the Removable Ring 1Y is slid into place as the indented section of the hinge 52 that is found on the Sub-Ring 1Z. On the opposite side of the hinge 52, image 39B provides one method of securing the Removable Ring 1Y to the Sub-Ring 1Z using a snap-tight closure 53. An indent 54 can provide an easy way to release the one connection, while remaining connected at the hinge 52, or both sides can be snap-tight closure 53 secured. Image 39C demonstrates how the Removable Ring 1Y and Sub Ring 1Z can be connected using a threaded element on both components.

DETAILED DESCRIPTION OF THE PREFERRED EMBODIMENTS OF THE INVENTION

With reference to the various embodiments and views of the apparatus according to this invention shown in FIGS. 1-39, those skilled in the art will appreciate from this disclosure that a wide range of shapes and sizes of image display devices are described and enabled herein. The apparatus for display of images of various shapes and sizes according to this invention includes but is not limited to square, rectangular, circular, oval, triangular, irregular, or other shapes, including square, rectangular or other angular shapes having rounded corners or vertices. Conventional structures with respect to which the present invention provides a novel and inventive departure are commonly referred to as picture frames, albeit such conventional structures do not exhibit the many advantages of the image display apparatus according to this invention. The method for manufacture and use of the components of the present image display device enables facile assembly and inexpensive manufacture of its component parts, thus accommodating a much broader range of image shapes, sizes, and substrates, including but not limited to paper, canvas, or fabrics, for display. The apparatus according to this invention is assembled, without the need for tools, from inter-locking components of almost any shape, which are retained in assembled form due to inclusion of barbs and stops sized to tightly fit the components together, while retaining the image substrate therebetween.

Components of the Present Image Display Apparatus, their Mode of Manufacture and Assembly to Display Said Image, Include:

(a) a ring component 1 comprising a vertical element 12 and a decorative face 13 element dimensioned so as, when assembled, to accommodate and retain in fixed but removable association with said ring component 1 both (i) a core component 17 and (ii) an image for display deployed on a support substrate, said core component 17 assembled on a first, outer aspect of the ring component 1 in relation to said vertical element 12, and said image for display deployed on a support substrate on a second, interior aspect of the ring component 1 in relation to said vertical element 12, to thereby present the image, including artwork, signage or the like, to the exterior of the apparatus for viewing;

(b) a core component 17, which in some embodiments bears decoration on an exterior aspect thereof, said core component being dimensioned and shaped to receive and be retained by the ring component 1; and, optionally, in certain preferred embodiments, (c) at least one backer-board retained in register with said image for display deployed on a support substrate.

Those having ordinary skill in the art will appreciate from the disclosure provided herein that said image for display may be deployed on a support substrate including but not limited to paper, canvas, fabric, glass, metal, plastic or the like as an image support and display area for inclusion in the apparatus of this invention. Such artisans will also appreciate from the present disclosure that said core element 17 and said image for display deployed on a support substrate are held in place by retention means including but not limited to projections, barbs, circumferential extensions of said ring component 1 formed on the exterior and interior surfaces of the vertical aspect 12 of the ring component 1. Equivalent retention means now known or which may hereafter come to be known may be used in place of the retention means enumerated here. Thus, for example, spring clips, glue, tape or the like may be used, but preferably, for ease of manufacture, assembly, and dis-assembly, retention means as shown and described herein, and obvious variants and equivalents thereof are used in the preferred embodiments of the apparatus of the present invention. Furthermore, as shown and described herein, in certain embodiments, by including a second backer-board below or behind a first backer-board or image support substrate (depending on how the apparatus is viewed, vertically or horizontally, respectively), a space or cavity is defined between the first and second backer-boards, if used. Inclusion of a portion of the second backer-board that can be opened or closed permits valuables or like items to be stored and secreted within said space or cavity. Further, as described and shown herein, inclusion of the second backer-board with said portion that can be opened or closed provides a stand element for display of the image when the apparatus is placed on a substantially horizontal support surface. In addition, said backer-board preferably includes therein a means for hanging the artwork, signage or other image exhibited by the assembled apparatus.

With reference to the figures, which are described in detail sequentially below, those skilled in the art are taught (via the extensive written description and enabling disclosure, as also supported in the figures) how to assemble (i.e. how to use) the various components and subcomponents of the apparatus of the invention.

Starting with FIGS. 1-8, an embodiment of the apparatus of this invention is represented as comprising a first, substantially circular or elliptical embodiment of ring component 1. Various embodiments include a ring component 1 comprising a decorative face 13, which is the portion of the apparatus most evident to viewers, analogous to the face portions of conventional picture frames. The decorative face 13 is dimensioned so that it extends beyond a substantially vertical portion 12 of said ring component 1, both outwardly and inwardly from the vertical component 12 such that during assembly, a lip portion 2 of the decorative face 13 extends outwardly from a vertical portion 12 of the ring component 1, is available to be slipped over a core component 17, as further shown and described in FIGS. 3, 5 and 6. The decorative face 13 extends outwardly from the vertical portion 12 of the ring component 1 at any angle with respect thereto including and between 120 to 10 degrees, and preferably including and between 90 and 30 degrees, and may been beveled, tapered, or otherwise ornamentally inscribed to enhance aesthetics for presentation of an image displayed by the apparatus when fully assembled. The decorative face 13 also extends inwardly from the vertical portion 12 of the ring component 1 at an angle of about 90 degrees from the vertical to form an image retention lip 6 as further described below.

When assembled with a core component 17, barbs, projections, or circumferential extensions 3, 4, and 5 projecting outwardly from the vertical portion 12 of the ring component 1, lower down the vertical portion 12 of the ring component 1, are provided to retain the ring 1 and core 17 components in tight association with each other, without the need for tooling.

Once assembled, the combined ring 1 and core 17 components are assembled with an image component 26, including but not limited to decorative art, signage or any other image sought to be displayed, by introducing an assembled image component into the core 17 via the bottom side of the ring 1, and is brought up to the underside of the decorative face 13 until it contacts the inwardly projecting lip 6 thereof.

The image component 26 is retained in tight association with the underside of inwardly projecting lip 6 by inwardly projecting barbs, projections, or circumferential extension 8, projecting inwardly from the vertical portion 12 of the ring component 1, lower down the vertical portion 12 of the ring component 1, thereby retaining the assembled ring 1 and core 17 components in tight association with each other and the introduced image component 26, without the need for tooling. The introduced assembled image component 26 is pushed up toward the underside of inwardly projecting lip 6, past inwardly projecting barb, projection, or circumferential extension 8, to rest on a top portion 7 of that barb. An additional inwardly projecting barb, projection, or circumferential extension 9, projecting inwardly from the vertical portion 12 of the ring component 1, lower down the vertical portion 12 of the ring component 1, is provided to retain an inner board 35 which is included to obscure, e.g. overlapping pieces of fabric, see FIG. 6, assembled as shown and described in FIGS. 15-20, with artwork, signage or other images included on the upper portion of such an embodiment of an assembled image component 41.

With reference to FIG. 3, which provides a cross-sectional side view of opposing edges of ring component 1, showing element 14, cross-sectioned through the left side of ring component 1, and element 15, cross-sectioned through the right side of ring component 1, which is manufactured either as a continuous and unitary ring component 1, or which is manufactured as a linear component, which is then trimmed or cut to a desired length with two terminal ends, said length then conformed to a desired shape, and the two terminal ends are connected to each other to form the desired continuous ring component 1.

Where the ring component 1 is manufactured as one long piece, it preferably comprises both male 10 and female 11 termini, wherein the female terminus is continuous throughout the ring except for the male end 10, to facilitate the two termini to be snapped together at the point of assembly by inserting the retained male terminus into the female terminus. The two termini at the unconnected ends of a ring component 1, are shown as 14 and 15, when they are created in a linear form. This aspect of this embodiment of the ring component would not need to be present when the ring component 1 is manufactured in a continuous shape, such as a circle, square, rectangle or the like.

Figure 4:
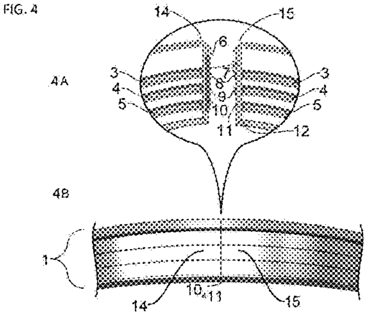
FIG. 4 provides, in detailed view 4A, shows the two terminal ends of a linear component, which has been trimmed or cut to a desired length which is then conformed to a desired shape and the two terminal ends comprising elements 14 and 15 thereof when brought into contact with each other prior to connecting them to each other, and in 4B, showing a side view of a portion of ring component 1, once the two terminal ends are connected to each other to form the desired continuous Ring component 1.

FIG. 4 provides, in detailed view 4A, the two terminal ends of a linear component which has been trimmed or cut to a desired length from the female end, which is then conformed to a desired shape and the two terminal ends comprising elements 14 and 15 thereof when brought into contact with each other prior to connecting them to each other; in 4B, a side view of a portion of ring component 1 is shown once the two terminal ends are connected to each other to form the desired continuous ring component 1.

Figure 5:
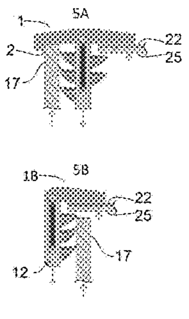
FIG. 5 provides a cross-sectional side view of ring component 1 in image 5A including a core element 17, a substrate 22 with signage, artwork or other image secured within ring component 1, and a substrate 22 rigid support 25 if the substrate 22 is not rigid, all deployed within Ring component 1 when assembled. Image 5B demonstrates the same concept with the use of an alternative ring embodiment 1B of the invention. With 1B, the same inner barbs are used to retain the image substrate 22 and the rigid support 25, but the core element 17 is retained within the inner barbs, as opposed to the outer barbs as in component 1. The image 5B, allows for a more decorative exterior edge without the need for the overlapping lip component 2, as is seen in image 5A. The same snap-together features are present, such as the image 22

FIG. 5 provides a cross-sectional side view of ring component 1 in FIG. 5A, including a core element 17, a rigid substrate 22 with signage, artwork or other image secured within ring component 1, and a substrate 22, support 25, all disposed within ring component 1 when assembled. In this view, it can be seen that ring component 1 has been slipped into the core component 17 with the overlapping lip 2 of the decorative face 13 shown covering the top end of the core component 17 which retains the core component 17 in contact with barbs, projections, or circumferential extensions 3, 4, and 5 projecting outwardly from the vertical portion 12 of the ring component 1, lower down the vertical portion 12 of the ring component 1, retaining the ring 1 and core 17 components in tight association with each other, without the need for tooling. Also shown in this view is a combined substrate 25 and image substrate 22 disposed above flexible tab, prong, projection or circumferential extension 8 of the vertical portion 12 of the ring component 1. In FIG. 5B, the same elements of the ring component 1 that are needed to support the image substrate 22 the backer-board support 25, and the core 17 are also present in the ring component configuration shown in FIG. 5B, in which the rig component 1 is shown as variant 1B, but they are all on the inside of the ring component variant 1B instead of some barbs being on the outside, as in ring component variant 1A.

FIG. 6 provides a cross-sectional side view of a ring component 1 in FIG. 6A, including a core element 17, and a flexible substrate, e.g. textile, fabric or like flexible substrate 36 bearing an image for display disposed thereon, supported by a pad element 37, and a support element 25, which supports the flexible substrate 36 bearing the image for display, thereby providing a "cushion top" feature, all disposed within ring component 1. The view shows ring component 1 inserted into core component 17, with fabric bearing an image for display 36 stretched over a pad 37 to provide a "Cushion Top" feature to this embodiment of the invention, exhibiting a convex shape. In addition to the rigid image support 25, also shown is a secondary backer-board 35 which obscures from view any part of the fabric 36 folded inside the space between support 25 and board 35, all deployed within the core component 17. In FIG. 6B, the same elements of the ring component 1 that are needed to support the flexible substrate 36, the pad element 37, the backer-board support 25, the secondary backer-board 35, and the core 17 are also present in the ring configuration shown in FIG. 6B, but they are all on the inside of the ring element 1B instead of some barbs being on the outside of the vertical portion of the ring component 1B.

Figure 7:
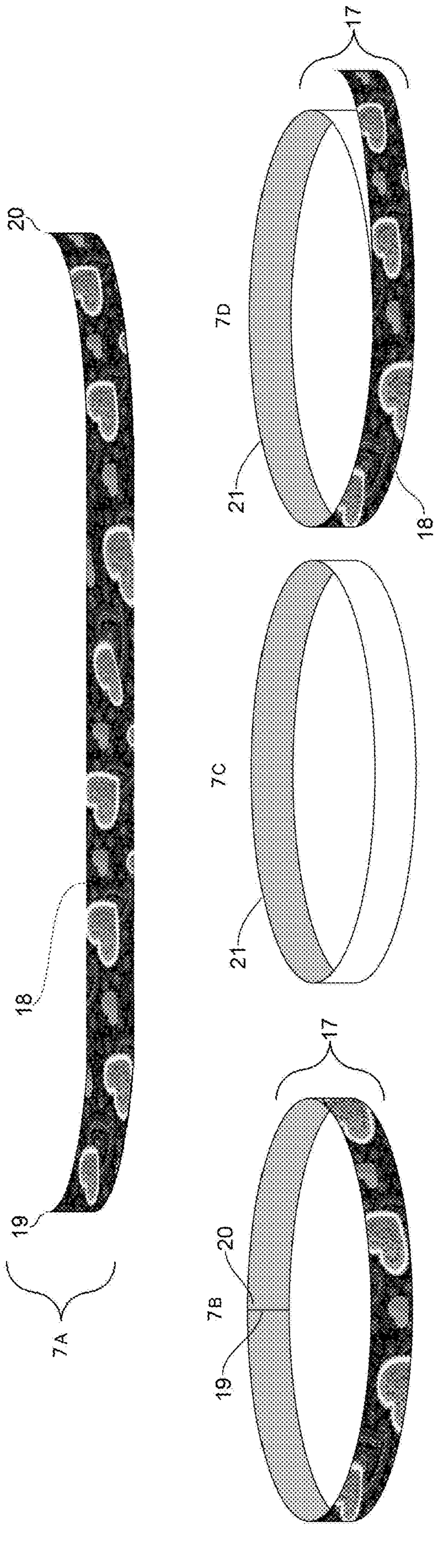
FIG. 7 provides views of a first embodiment of a core component 17 which is manufactured as a unitary element of appropriate dimensions and shape to fit within the construct of the ring component 1, or which as shown in 7A, is manufactured as a linear element which is trimmed to a desired length with two termini, 19 and 20, and then conformed to a desired shape to fit around the exterior of ring component 1, and joining the two termini 19 and 20 to each other, 7B; in a preferred embodiment, the exterior surface 18 of core component 17 is decorated, e.g. by printing on flexible paper which is adhered to a core support element 21, as shown in 7C and 7D, or is printed directly on rigid paper-board, plastic, metal or like substrate, together forming the core component 17 of appropriate shape to fit within the construct of ring component 1. When done in mass, it is likely that a large print will be adhered to a lengthy core and then cut to size.

FIG. 7 provides views of a first embodiment of a core component 17 which is manufactured as a unitary element of appropriate dimensions and shape to fit around the exterior of ring component 1, or which, as shown in 7A, is manufactured as a linear element which is trimmed to a desired length with two termini, 19 and 20, and then conformed to a desired shape to fit with the ring component 1, and joining the two termini 19 and 20 to each other, 7B; in a preferred embodiment, the exterior surface 18 of core component 17 is decorated, e.g. by printing directly on the core component, or by printing on flexible paper, plastic or like substrate, which is adhered to a core support element 21, 7C and 7D, or is printed directly on rigid paper-board, plastic, metal or like substrate, together forming the core component 17 of appropriate shape to fit with the ring component 1. Where artwork or like decorative element 18 is printed on a flexible substrate, it can be wrapped around an undecorated rigid core element 21 and then adhered to form a decorated core element 17.

Figure 8:
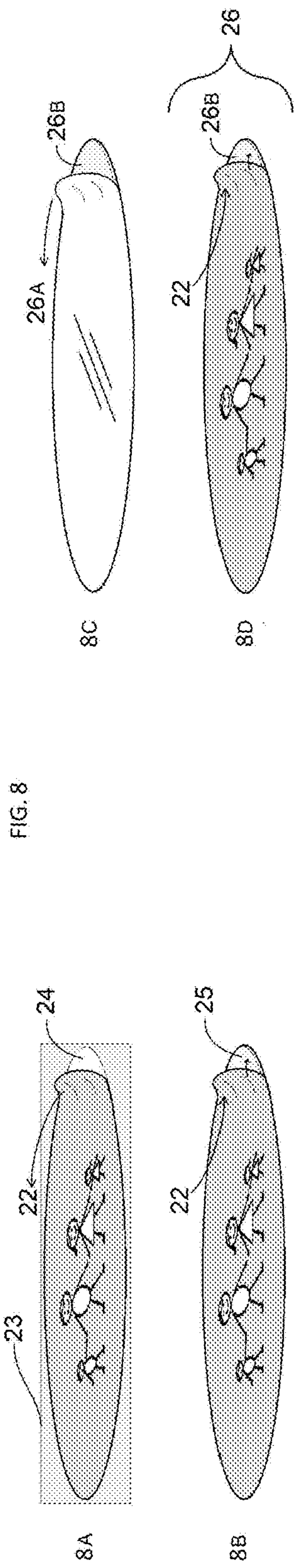
FIG. 8 provides an elevational view of a first embodiment of an image 22 printed, painted on, or in any other means created on the obverse surface of a first substrate that reveals an adherent sticker on the reverse when peeled from the substrate 24, 8A. This adherent sticker 22 can then be adhered to a rigid substrate 25 as in 8B, which may be already appropriately shaped.

FIG. 8 provides elevational view of a first embodiment of an image 22 printed, painted on, embroidered, sewn or in any other means created on the surface of a first substrate 23, 8A, and which, in this figure, is then adhered, 8B, to e.g. a sticky, loop and hook (aka VELCRO®), or like adherent surface 25 present on or revealed on a support substrate 26B when a protective sheet 26A is removed from an incipiently adherent substrate 26B if needed 8C, such that when the bottom side (i.e. the obverse) of the image substrate 22 is contacted with the adherent surface 26B it adheres thereto such that the support substrate 26B supports the image 22 present on a top surface of said substrate 26B, such that when assembled, an assembled image component 26 is created ready to be exhibited when assembled with said ring component 1 and said core element 17.

FIG. 9 provides a representation of the assembly of the assembled image display component 26 of a first embodiment of the present invention as it is inserted into a first embodiment of the ring component 1 of the invention. The display component 26 is inserted past flexible inner barbs 8 and 9, and then rests on top of barb 8 on the shelf 7. Together, they produce an assembled combined image and ring component 27 ready for assembly with the remaining components of the invention.

FIG. 10 provides a representation of the assembly of a first embodiment of the assembled combined image and ring component 27 with a first embodiment of a core component 17 of the apparatus according to this invention, to produce an assembled core-ring-image component 28 according to the invention, ready for assembly with the remaining components of the invention. A bottom perspective of component 28 is also provided as 29, showing the lip 2 that both aids in retaining the core element 17's shape, but also helps conceal any irregularities with the core element's 17 edging. Also depicted in FIG. 10 is the upper ledge 7 of top barb 8 upon which the outer edge of the image component 26 rests, once pressed into place. Optionally, a secondary barb component 9 is provided for use in other product configurations discussed in relation to other embodiments of the invention. The embodiment 28 shown in FIG. 10 may be considered a first embodiment of the invention, with or without secondary barb component 9. As such, this embodiment 28 may be hung from a hook on a wall, for example, without the need for any additional hardware, as the core element 17 in combination with ring element 1 and an image element 26 is adequately rigid to retain shape when so hung. Naturally, those skilled in the art will appreciate the extremely minimal, simple, and inexpensive nature of this particular embodiment of the invention.

Ring element 1 is optionally comprised of plastic, metal, wood or like material known in the art for framing artwork and other images, as described herein. When made from plastic, methods known in the art including injection molding, additive manufacturing (also known as "3D Printing"), blow molding or any other standard form of plastic manufacture known in the art may be employed to create this element. When made from metal, likewise, those skilled in the arts of extrusion, molding of molten metal, and the like, for such metals as aluminum, copper, bronze, various alloys, and the like, may be employed. When made from wood, the arts of wood cutting, bending, shaping may likewise be employed. For example, any regular shape disclosed herein is susceptible to manufacture from e.g. bamboo, by methods known in the art. Certain elements are preferably made from flexible rubber, such as latex or like materials, which will permit the bending and resilient return of a tab to its required shape to hold a planar art piece, image, or the like, in register with the remaining elements of the structure as disclosed herein. Likewise, for core element 17, which may be manufactured from wood, plastic, rubber, metal, foam, or the like, using methods and materials known in the art.

In FIG. 11, a representation is provided, in, FIG. 11A, of a first embodiment of a backer-board component 30 which is included in a second embodiment of the invention, comprising a backer board assemblage 33, assembled by providing backer-board component 30 manufactured or cut to match the shape and size of a second ring component, referred to herein as rear-ring component 1*i*, shown in FIG. 11B. Second ring component 1*i* may be identical or substantially identical to ring component 1, but flipped in orientation with respect to ring component 1 described herein above, or it may differ, as discussed further herein below, to accommodate various additional embodiments of the invention. Backer-board 30 is inserted into the second ring component 1*i*, as shown in FIG. 11C, (much as the image component is inserted into ring component 1 as shown in FIG. 9), to form a first embodiment of a rear aspect assemblage of the invention 33. If included, rear aspect assemblage 33 would complete the rear aspect of the image display apparatus according to this invention, as shown in FIG. 12, thus providing a more finished and complete looking frame assemblage.

FIG. 12 provides, in FIG. 12A, a bottom perspective representation of the assembled image-ring-core aspect of this invention 29, (which is just the lower aspect view of the same embodiment 28 from an elevational view, as shown in FIG. 10), showing the bottom of the image display side of the apparatus, showing the main components all assembled, including the image positioned or adhered to the image support and enclosed within the ring component 1 which is enclosed within a first embodiment of a decorated core element 17. To accommodate this embodiment of the invention, core element 17 is dimensioned such that it is of sufficient height to accommodate both the vertical aspect 12 of first ring element 1 being inserted into and engaged with the inner superior aspect of core element 17, and the vertical aspect 12 of second ring component 1*i* being inserted into and engaged with the inner inferior aspect of core element 17. In FIG. 12B, there is shown a bottom perspective view of the rear aspect assemblage 33 of the image display apparatus according to this invention, which, as shown in FIG. 11C, comprises a rear-ring component 1*i* assembled with the backer-board component 30. In 12C, components 29 and 33 from FIGS. 12A and 12B are assembled by inserting component 33 into the inferior inner aspect of the core element, 17, which, when fully assembled, represents a second embodiment 34 of the apparatus according to this invention. Artwork or any other image or signage adhered to the artwork sticky support pad 26 is shown assembled into the ring component 1 and inserted into the superior inner aspect of decorated core component 17, while the rear aspect assemblage 33 comprising ring component 1*i* is inserted into and engaged with the inferior inner aspect of decorated core element 17. In FIG. 12D, the same view also provides a representation of an optional pop-out element 31 which, when deployed in an open position, provides a stand to support the fully assembled apparatus on a support surface. Within a cavity or space defined between the first and second backer-boards, behind the pop-open element 31, when deployed in a closed position, items sought to be secreted from easy view may be stored; also shown is a hanging hole or receptacle 32 available to receive e.g. the head of a nail to permit the assembled apparatus to be hung on a wall and to display the image in that orientation. Naturally, those skilled in the art will appreciate that a hanging wire may be provided, affixed to the rear aspect assemblage, 33, using conventional means known in the art for such fixation.

FIG. 13 provides a top perspective view in FIG. 13A of a further embodiment of a decorated core element that has been shaped, on the superior edge 17B of core element 17, using, for example, a paper tube curling process or an equivalent thereof to provide a forward stop 46 for the assembled image display component 26. When assembled image display 26 is inserted into place inside core element 17B, as in FIG. 13B, by means of compression, or other means, such as tape or glue, or the like, to hold the image-backer-board component 26 against the forward stop 46 of the interior of core element 17, in superior edge 17B thereof. Once assembled, these components form the top part of the product 29B that will be visible when displayed according to this invention. Inclusion of this embodiment or an equivalent thereof of core element 17 thus represents a further embodiment of this invention.

FIG. 14, in FIG. 14A, provides an underside perspective of the image-backer-board-core 29B, as it is being inserted over the second ring component 1*i* and backerboard component 33 to form a further embodiment of apparatus 34B according to this invention. FIG. 14B provides a top perspective representation of the fully assembled product 34B showing the image display side of the apparatus, showing the main components all assembled, including the image adhered to the image support and enclosed within the curled decorated core element 17B. Also, shown in FIG. 14B are top and bottom perspective views of the fully assembled product 34B, including the image-backboard/support-core component 29B assembled with the complete rear aspect assemblage 33, made of the second ring component 1*i* and backer-board component 30, all contained within the core component 17B. This view also provides a representation of an optional pop-out element 31 and a hanging hole or receptacle 32.

FIG. 15 provides a representation of an embodiment according to this invention wherein an image, such as artwork, is printed, painted, or stitched on a flexible substrate such as fabric 36 as shown in FIG. 15A, which is placed over or stretched across a pad 37, such as a foam pad or the like, thereby imposing a convex shape 38 to the image when inserted into the ring element 1 as shown in FIG. 16. In FIG. 15B, the image and pad 38 are stacked on and supported by a backer-board component 25 thereby forming an image-pad-backer-board component 40, ready to be assembled with the remaining components of the apparatus, to form yet a further, fourth, embodiment according to this invention.

FIG. 16 provides a representation of the assembly of the image-pad-backer-board component 40 such that these components are pushed into and locked into place inside ring component 1 to complete a top assembly 41 ready to be assembled with the remaining components of the apparatus.

FIG. 17 provides a representation of the top image-pad-backer-board-ring assembly 41 being inserted into a decorated core 17, so as to produce an image-core assembly 42.

FIG. 18 provides a representation of the image-core assembly 42 showing how excess flexible substrate 36 hanging loose within the core element can be tucked in and hidden by inserting a second backer-board component 35 into the core component for retention by a barb, projection or circumferential extension 9, defined in the interior of the ring component 1 as inward projections from the vertical component 12 thereof, which also retains the outer-decorative core 17 in association with each other, to produce component 43 ready to receive a final backer-board to complete this embodiment of the apparatus, or, this embodiment may be hung without requiring a second backer-board.

FIG. 19 shows assembly of the print-ring-foam-backer-board-core component 43 receiving and being assembled with a separately assembled second ring component-backer-board 33 component to produce an embodiment of the fully assembled apparatus 34A, shown in upper-side and lower-side perspective views of this apparatus.

FIG. 20, FIG. 20A provides an upper-side perspective view of an embodiment of a decorated core element that has been shaped 46 on the superior edge 17B thereof using a tube curling process or the like, and the image-pad-backer-board component 40 is inserted into the non-curled inferior opening of the decorated core element 17B. The image-pad-backer-board component 44 is held in place by means of compression fit or other means such as tape or glue, or the like, against the superior shaped end 46 of core element 17B Once assembled, the print-foam-baker-board-curled core 43A forms the top part of a yet further embodiment of the product of this invention that will be visible when displayed according to this invention. FIG. 20B provides under-side and upper-side representations of an assembled print-foam-backer-board-curled core 43A as it is receiving the separately assembled second ring component-backer-board 33 component to produce a further embodiment 43B of the fully assembled apparatus in accordance with this invention shown in both the top and bottom side perspectives views.

FIG. 21 provides a representation of a substantially rectangular image area 26 for display and assembly with a matching, substantially rectangular embodiment of ring component 1 which is assembled with other components according to the invention, dimensioned appropriately, substantially as described in FIGS. 1-20. Those skilled in the art will appreciate that essentially any shaped image area for display is amenable for display in the apparatus according to this invention, including but not limited to a square, a rectangle, a triangle, or any like or irregular shape, including variations of such shapes, such as where corners or vertices are rounded. The decorative ring surface 13, and its associated overlapping rim 2, is also demonstrated as part of this rectangular embodiment of ring component 1. The outside area of this component shows the barbs 3, 4, and 5 as being visible from this side representation that are used to compression fit within the receiving core element 17 as shown in FIG. 22. The inside area of this embodiment of the ring component 1 also displays ring barb element 8 to support and hold in place the rigid supporting backer-board 25, and the barb element 9 that is used to support the secondary rigid supporting backer-board 35 as is detailed in FIG. 18. When fully assembled, they form the complete frontal image component 27.

FIG. 22 provides an upper-side representation of the substantially rectangular image area for display 27, which is then contacted with and deployed within a flexible and decorated core component 17 which is manipulated to match the outer contours and shape of the substantially rectangular ring and image assembly 27 to form artwork-ring-core component 28 as the front and side completed perspective view of this embodiment of the assembled apparatus, which may be hung as is as yet a further embodiment of the invention.

FIG. 23 provides a representation of top and bottom perspective view of an assembled artwork-ring-core component 28 of a substantially rectangular embodiment of the apparatus according to the invention, which is also depicted from a bottom perspective view of the assembled structure when it is flipped over 29, such that the image is facing away from view. Here, the assembly aspects of the apparatus can be viewed, such as 7, 8, 9, and 26 as were previously described in FIG. 21.

FIG. 24 provides a bottom representation of an appropriately shaped and dimensioned backer-board component 30 which is inserted into a second substantially rectangular embodiment 1*i* of the ring component which is also shown assembled as 33. FIG. 25 provides a bottom perspective representation of the assemblage of the image-ring-core component 29, as it is positioned over and compression fit over the substantially rectangular backer-board assembly 33 to produce a top perspective of the embodiment of the fully assembled apparatus 28, and a bottom perspective of the same embodiment shown as 34.

FIG. 26 is a top perspective view of an embodiment according to this invention wherein an image, such as artwork, is printed, painted, or stitched on a flexible substrate such as fabric 36 that is placed or stretched across a substantially rectangular pad 37B, such as a foam pad, thereby imposing a convex shape 38B to the image. The image 36 and pad 37B are then stacked on and supported by a backer-board component 25B, thereby forming an image-pad-backer-board component 38B, ready to be assembled with the remaining components of the apparatus.

FIG. 27 provides a top perspective representation of a substantially rectangular embodiment of ring component 1 ready to receive the assembly of the image-pad-backer-board component 38B such that these components are locked into place inside ring component 1 to complete a top assembly 41B, ready to be assembled with the remaining components of the apparatus.

FIG. 28 shows a top and bottom perspective of the assembly of the image-ring-backer-board component 41B as it is inserted into a separately assembled core 17 and rear ring-backer-board assembly 33 to produce yet a further embodiment of the fully assembled apparatus 43*c* shown from a top perspective view.

FIG. 29 depicts a method of using above-described embodiments of the apparatus to serve as a decorative top or lid element for a similarly shaped storage device, such as a keepsake container. The top perspective of an assembled core-ring-image component 28 is presented in accordance with the invention, ready for assembly with the remaining components of the keepsake container 44. The underside of core-ring-image component 29 is also presented to demonstrate the same previously described components of this apparatus. In these embodiments, the same manufacturing methods as described above are employed. Preferably, either a ring component 1X as shown in FIG. 33 is used to provide the concealment of any irregularities on the inferior edge of the core 17, and to provide durability to this potentially frequently handled edge. Alternatively, other techniques to produce an appealing and finished inferior edge to the decorated core 17 are used, including but not limited to overlapping and tucking under excess decorative print to the inside of the decorated core 17. When components 29 and 44 are assembled, they form the final easily assembled, customized top, keepsake product 45A.

FIG. 30 is a similar product configuration as described in FIG. 29 but with the inclusion of the flexible print top embodiment 43 as described in FIG. 18, allowing the same embodiment 43 to be used to make more than one final product configuration. When this embodiment is assembled with the keepsake container 44, a cushion top effect completes the assembled keepsake container embodiment 45B.

FIG. 31 provides a top perspective view of a further embodiment of a decorated core element that has been shaped 46 on the superior edge 17B of the core element using a tube curling process or the like, and the image-pad-backer-board component 40 is inserted via the non-curled end of the decorated core component 17B until it abuts against and cannot pass the shaped end 46. Component 40 is held in place by means of compression fit or other means such as tape or glue, or the like to hold the image-pad-backer-board component 40 against the shaped end 46 to form the assembled top portion of this keepsake embodiment 43A. Although not depicted here, a secondary backer-board component 35, as shown in FIG. 18, could serve to conceal the excess flexible substrate hanging loose within the core element to demonstrate a more finished look inside of the assembled top 43A.

FIG. 32 provides a top perspective of the assembled image-pad-backer-board-core component 34A positioned over and joining with a keepsake container 44 to create a cushion-top effect for the completely assembled keepsake container embodiment 45C of this invention.

FIG. 33 provides a bottom perspective of a ring component 1X in 33A, with an inside finished area 39 that differs from the standard ring component 1 in that it does not have any inside barbs 8 or 9 that are used to hold in place within ring 1 a print, pad, and/or backer board as shown in FIG. 5 and FIG. 6. The purpose of this embodiment is for ring component 1X to provide a finished inferior core edging that would otherwise remain unfinished, exposing potential irregularities on the decorated core edge, seen in FIG. 34 as component 43A. The ring component 1X also serves to protect the inferior edge of the core from wear during likely frequent handling. A cross-sectional side view of opposing edges of ring component 1X is provided in FIG. 33B which has most of the same elements defined in FIG. 3 with the addition of the finished interior wall 39, and the absence of the inside image retention lip 6, and the absence of the aforementioned barbs 8 and 9 as seen in FIG. 1. FIG. 33B shows the decorative top surface of the ring component 1X as 13, and the overhanging lip 2 which is designed to both aid in retaining the position and engagement of decorated core 17 and to provide cover for potential decorative core 17 edge irregularities. Barbs 3, 4, and 5 are also shown here which are used to hold the ring 1X inside the decorated core 17. Component 12 is also displayed here to show that the male connecting end 10 can also be used in this ring 1X configuration, in conjunction with the female aspect 11 shown in FIG. 33C. In FIG. 33C, the decorated core 17 is shown as having been put into place inside the ring 1X. The decorated core 17 will stay in place having compressed the barbs, and fitting under the lip 2. As a means of allowing ring component variants 1X, or 1*i* to be used in either a wall mount or keepsake container configuration, FIG. 33D shows how an additional hanging receptacle 48 is included in the manufacturing of the ring 1X or 1*i* and used as a means of hanging the apparatus over a nail or picture frame hook. Alternatively, or in addition, a hanging receptacle perforation 49 is manipulated or bent to break away the hanging receptacle 48 for use of the apparatus in conjunction with a keepsake container 44 as shown in FIG. 35.

FIG. 34 provides both an upper and lower perspective representation of the flexible print-ring-core-backer-board embodiments 43A described in FIG. 20 as it is positioned and pressed over the decorative and protective ring 1X. Once 1X is compression fit into place into the inferior opening of the top core-print-pad-backer board 43A, a complete top display assembly 47 is formed, ready to be used either for independent display or for use over a keepsake container 44.

FIG. 35 provides a top perspective representation of a complete top display assembly 47 as it is used as a lid, positioned over a keepsake container 44.

FIG. 36 provides a top perspective representation of a completed top display assembly positioned over the top of the keepsake container 44 in a substantially round dimension. It will be appreciated by those skilled in the art that various embodiments of the apparatus according to invention be used as uniquely shaped image displays, such as square, rectangular, circular, oval, triangular, irregularly shaped, or other angular shape, preferably having rounded corners or vertices, to be used independently, as in being hung on a wall, or placed on a table, or positioned as a lid over, for example, an open top of a keepsake container 44.

FIG. 37 provides one completely assembled top perspective representation of a fully assembled apparatus in 37A of a method of assembling a Removable Ring 1Y that can be separated from a Sub-Ring 1Z, making the apparatus more suitable to be used as a storage or keepsake-like container, while protecting the edge of the Core component 17; even if used as wall art, desktop art, a puzzle box, a tree ornament, or any other decorative container. Molded geometry is one example of a decorative face 13 as part of the Removable Ring 1Y. Image 37B shows the same perspective as image 37A of a fully assembled apparatus that has been pared to reveal all assembled components. There, you will see the accompanying product elements such as the rigid substrate 22, and a secondary backer-board 35, both designed to complete the Removable Ring 1Y. In its connected state to the Sub-Ring IZ, another optional backer board 51 is used to close off the fully assembled product if it is used as signage or a slender keepsake product, without the use of a Core component 17 or a secondary Removable Ring 1Y and secondary Sub-Ring IZ. FIG. 37 also demonstrates a cross-sectioned perspective of both the Removable Ring 1Y and secondary Sub-Ring 1Z in image 37C, without the other apparatus elements. The same barbs that were used in the original Ring 1 design in FIG. 3 are again employed, in addition to the space made available as element 50 to hold the optional backer board 51 in place. Image 37D provides the same cross-sectional perspective along with the added previously defined elements of substrate 22, support 25, a secondary backer-board 35, a Core component 17, and the optional backer-board 51.

FIG. 38 separates the previously described apparatus elements from the Removable Ring 1Y and Sub Ring 1Z to focus on connection possibilities. Image 38A shows both of the aforementioned elements prior to them being connected by way of a hinge 52 element. In 38B the Removable Ring 1Y and Sub Ring 1Z have been connected via the hinge 52 and are resting in the closed position.

Image 38C depicts the Removable Ring 1Y and Sub Ring 1Z in a partially separated position while remaining connected at the hinge 52.

FIG. 39 provides a close up perspective of three different methods of connecting the Removable Ring 1Y to the Sub Ring 1Z. Image 39A is a close up perspective of the aforementioned hinge 52, that primarily uses a ball and socket connection. The hemisphere shown as part of the Removable Ring 1Y is slid into place as the indented section of the hinge 52 that is found on the Sub-Ring 1Z. On the opposite side of the hinge 52, image 39B provides one method of securing the Removable Ring 1Y to the Sub-Ring 1Z using a snap-tight closure 53. An indent 54 can provide an easy way to release the one connection, while remaining connected at the hinge 52, or both sides can be snap-tight closure 53 secured. Image 39C demonstrates how the Removable Ring 1Y and Sub Ring 1Z can be connected using a threaded element on both components.

What is claimed is:

1. An image display apparatus comprising:

(a) a ring component 1 comprising a vertical element 12, wherein said vertical element orientation is 120 to 10 degrees with respect to an upper decorative face 13 element dimensioned so as, when assembled, to accommodate and retain in fixed but removable association with said ring component 1 both (i) a core component 17 and (ii) an image for display deployed on a support substrate, said core component 17 assembled on a first, outer aspect of the ring component 1 in relation to said vertical element 12, and said image for display deployed on a support substrate on a second, interior aspect of the ring component 1 in relation to said vertical element 12, to thereby present the image, including artwork, signage or the like, to the exterior of the apparatus for viewing; and (b) a core component 17, optionally bearing decoration on an exterior aspect thereof, said core component being dimensioned and shaped to receive and be retained by said ring component 1.

2. The image display apparatus according to claim 1 further comprising:

(c) at least one backer-board assembled within a second ring component 1*i* or 1X, inserted in opposite orientation with respect to said ring component 1, via the inferior opening of core component 17 which thereby retains said at least one backer-board in register with said image for display.

3. The image display apparatus according to claim 1 wherein said ring component is dimensioned is a square, rectangular, circular, oval, triangular, irregularly shaped, a square, rectangular or other angular shape having rounded corners or vertices.

4. The image display apparatus according to claim 1 wherein said image for display is deployed on a support substrate selected from the group consisting of: paper, board, wood, canvas, fabric, glass, metal, and plastic.

5. The image display apparatus according to claim 1 wherein said core element 17 and said image for display deployed on a support substrate are held in place by retention means selected from the group consisting of: projections, barbs, and circumferential extensions of said ring component 1 formed on the exterior and interior surfaces of the vertical aspect 12 of the ring component 1.

6. The image display apparatus according to claim 5 wherein (a) said ring component 1 and said core component 17 are retained in tight association with each other, without the need for tooling by said barbs, projections, or circumferential extensions 3, 4, and 5 projecting outwardly from the vertical portion 12 of the ring component 1, (b) said image component 26 is retained in tight association with the underside of inwardly projecting lip 6 by inwardly projecting barbs, projections, or circumferential extension 8, projecting inwardly from the vertical portion 12 of the ring component 1, thereby retaining the assembled ring 1 and core 17 components in tight association with each other and the introduced image component 26, without the need for tooling.

7. The image display apparatus according to claim 5 wherein said core component 17 which is manufactured as a unitary element of appropriate dimensions and shape to fit around the exterior of ring component 1, or which is manufactured as a linear element which is trimmed to a desired length with two termini, 19 and 20, and then conformed to a desired shape to fit around the exterior of ring component 1, and joining the two termini 19 and 20 to each other, wherein the exterior surface 18 of said core component 17 is decorated.

8. The image display apparatus according to claim 1 wherein said at least one backer-board is included and is retained in register with said image for display deployed on a support substrate is selected from the group consisting of: paper, board, wood, canvas, fabric, glass, metal, and plastic and wherein at least one of said at least one backer-board includes therein a means for hanging the artwork, signage or other image exhibited by the assembled apparatus.

9. The image display apparatus according to claim 8 wherein two backer-boards are retained within said ring component.

10. The image display apparatus according to claim 9 wherein a space or cavity is defined between said two backer-boards.

11. The image display apparatus according to claim 10 wherein the second backer board, furthest from the image for display comprises a portion that can be opened or closed to:

(a) permit items to be stored and secreted within said space or cavity, (b) provide a stand element for display of the image when the apparatus is placed on a substantially horizontal support surface, or (c) both (a) and (b).

12. The image display apparatus according to claim 1 wherein said ring component 1 comprises a decorative face 13 dimensioned so that it extends beyond a substantially vertical portion 12 of said ring component 1, both outwardly and inwardly from 12 such that during assembly, a lip portion 2 of the decorative face 13 extends outwardly from a vertical portion 12 of the ring component 1, is available to be slipped over a core component 17, and wherein:

(a) said outwardly extended portion of said decorative face 13 extends at any angle including and between 120 to 10 degrees, with respect to said substantially vertical portion 12;

(b) said outwardly extended portion of said decorative face 13 is beveled, tapered, or otherwise ornamentally inscribed to enhance aesthetics for presentation of an image displayed by the apparatus when fully assembled;

(c) said inwardly extended portion of said decorative face 13 extends inwardly at an angle of about 90 degrees from the vertical 12 to form an image retention lip 6.

13. The image display apparatus according to claim 1 which is manufactured either as a continuous and unitary ring component 1, or which is manufactured as a linear component, which is then trimmed or cut to a desired length with two terminal ends, said length then conformed to a desired shape, and the two terminal ends are connected to each other to form the desired continuous ring component 1.

14. The image display apparatus according to claim 1 wherein the image to be displayed is present on a flexible substrate 36 and is supported by a pad element 37 and a support element 25 which supports the flexible substrate 36 bearing the image for display, thereby providing a "cushion top" feature exhibiting a convex shape, optionally including a secondary board 35 which obscures from view any part of the fabric 36 folded inside the core component 17.

15. The image display apparatus according to claim 1 comprising an assemblage of an image and appropriately dimensioned and shaped ring and core components 28 deployed as a decorative top or lid element for a similarly shaped keepsake box 44.

16. A method of making an image display apparatus which comprises:

(a) providing a ring component 1 comprising a vertical element 12, wherein said vertical element orientation is 120 to 10 degrees with respect to an upper decorative face 13 element dimensioned so as, when assembled, to accommodate and retain in fixed but removable association with said ring component 1 both (i) a core component 17 and (ii) an image for display deployed on a support substrate, said core component 17 assembled on a first, outer aspect of the ring component 1 in relation to said vertical element 12, and said image for display deployed on a support substrate on a second, interior aspect of the ring component 1 in relation to said vertical element 12, to thereby present the image, including artwork, signage or the like, to the exterior of the apparatus for viewing; (b) providing a core component 17, which in some embodiments bears decoration on an exterior aspect thereof, said core component being dimensioned and shaped to receive and be retained by the ring component 1; and optionally, (c) providing at least one backer-board retained in register with said image for display deployed on a support substrate; and (d) assembling elements (a)-(b) or (a)-(c), if present, such that said ring component 1 retains said core component, an image supported by a substrate and, if included, said least one backer board in register with each other.

17. A method of use of the image display apparatus according to claim 1 which comprises:

(a) providing a ring component 1 comprising a vertical element 12 and a decorative face 13 element dimensioned so as, when assembled, to accommodate and retain in fixed but removable association with said ring component 1 both (i) a core component 17 and (ii) an image for display deployed on a support substrate, said core component 17 assembled on a first, outer aspect of the ring component 1 in relation to said vertical element 12, and said image for display deployed on a support substrate on a second, interior aspect of the ring component 1 in relation to said vertical element 12, to thereby present the image, including artwork, signage or the like, to the exterior of the apparatus for viewing;

(b) providing a core component 17, which in some embodiments bears decoration on an exterior aspect thereof, said core component being dimensioned and shaped to receive and be retained by the ring component 1;

(c) providing at least one backer-board retained in register with said image for display deployed on a support substrate; and (d) assembling elements (a)-(c) such that said ring component 1 retains said core component, an image supported by a substrate and at least one backer board in register with each other, so as to display said image for viewing.

* * * * *